Patented June 28, 1932                                                                                    1,865,204

UNITED STATES PATENT OFFICE

MICHAEL OTTO, OF LUDWIGSHAFEN-ON-RHINE, AND LEOPOLD BUB, OF MANNHEIM, GERMANY, ASSIGNORS TO I. G. FARBENINDUSTRIE AKTIENGESELLSCHAFT, OF FRANKFORT-ON-THE-MAIN, GERMANY

PRODUCTION OF VOLATILE FLUORIDES

No Drawing. Application filed February 28, 1930, Serial No. 432,259, and in Germany March 6, 1929.

The present invention relates to the production of volatile fluorides.

We have found that volatile fluorides are obtained in an excellent yield by treating a mixture of a metal fluoride and the oxide of the element, the volatile fluoride of which is to be prepared, with sulphur trioxide. When treating, for example, boric anhydride and calcium fluoride with sulphur trioxide the reaction proceeds in accordance with the equation

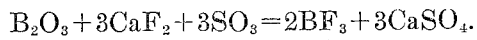
$$B_2O_3 + 3CaF_2 + 3SO_3 = 2BF_3 + 3CaSO_4.$$

Among the numerous metal fluorides that may be used in the process according to our invention the most important one is calcium fluoride, but others as for example sodium-aluminium fluoride may be used as well.

The sulphur trioxide may be employed as such or in the form of a solution, for example in anhydrous sulphuric acid, that is in the form of fuming sulphuric acid. The process may be carried out at room temperature, but in order to obtain good yields of the volatile fluorides we prefer to work at elevated temperatures of the order of for example 200° 300° C.

The process may be carried out periodically, for example by introducing the reacting materials into a closed vessel and causing them to react therein, or in a continuous manner, for example by means of a long furnace provided with a worm conveyor in which the sulphur trioxide is passed in counter-current to the mixture of the other reacting materials.

The following example will further illustrate how our invention may be carried out in practice, but the invention is not restricted to this example. The parts are by weight.

Example

A mixture of 280 parts of boric anhydride and 1040 parts of calcium fluoride is slowly heated to 250°, while stirring with 1300 parts of sulphur trioxide in a revolving autoclave in which for thoroughly mixing the reacting materials some iron balls are present. When the pressure in the autoclave has increased to 36 atmospheres the pressure is released and the mass is then again heated to the aforesaid temperature while revolving the autoclave. Thereby the pressure increases again to about 20 atmospheres. 530 parts of boron fluoride are obtained. When using kryolithe instead of calcium fluoride under otherwise similar conditions 400 parts of boron fluoride are obtained.

In an analogous manner other fluorides can be obtained. Thus the treatment of 120 parts of quartz powder and 320 parts of calcium fluoride with 400 parts of sulphur trioxide furnishes 120 parts of silicon fluoride. Similarly 150 parts of phosphorus pentoxide, 450 parts of calcium fluoride and 600 parts of sulphur trioxide yield 120 parts of phosphorus pentafluoride, and 200 parts of arsenic trioxide, 260 parts of calcium fluoride and 300 parts of sulphur trioxide yield 240 parts of arsenic trifluoride.

What we claim is:—

1. The process of producing volatile fluorides which comprises treating a mixture of a metal fluoride and the oxide of the element, the volatile fluoride of which is to be produced, with sulphur trioxide.

2. The process of producing volatile fluorides which comprises treating a mixture of a metal fluoride and the oxide of the element, the volatile fluoride of which is to be produced, with sulphur trioxide at a temperature between about 200° and 300° C.

In testimony whereof we have hereunto set our hands.

MICHAEL OTTO.
LEOPOLD BUB.